United States Patent
Ohno et al.

(10) Patent No.: US 9,925,943 B2
(45) Date of Patent: Mar. 27, 2018

(54) VEHICLE OCCUPANT PROTECTION DEVICE

(71) Applicant: TOYOTA JIDOSHA KABUSHIKI KAISHA, Toyota-shi (JP)

(72) Inventors: Mitsuyoshi Ohno, Miyoshi (JP); Yasushi Masuda, Kiyosu (JP); Shigeyuki Suzuki, Kiyosu (JP); Shinichi Ishida, Kiyosu (JP); Takenori Ozaki, Kiyosu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/286,172

(22) Filed: Oct. 5, 2016

(65) Prior Publication Data

US 2017/0158155 A1  Jun. 8, 2017

(30) Foreign Application Priority Data

Dec. 4, 2015  (JP) .................................. 2015-237979

(51) Int. Cl.
*B60R 21/207* (2006.01)
*B60R 21/237* (2006.01)

(52) U.S. Cl.
CPC .......... *B60R 21/207* (2013.01); *B60R 21/237* (2013.01); *B60R 2021/2074* (2013.01)

(58) Field of Classification Search
CPC ................. B60R 21/207; B60R 21/237; B60R 2021/2074
See application file for complete search history.

(56) References Cited

U.S. PATENT DOCUMENTS

| 3,753,576 | A | * | 8/1973 | Gorman | B60R 21/207 280/730.1 |
| 3,953,049 | A | * | 4/1976 | Surace | B60R 21/08 280/730.1 |
| 6,474,733 | B1 | * | 11/2002 | Heilig | B60N 2/4415 297/216.12 |
| 2014/0327234 | A1 | * | 11/2014 | Heurlin | B60R 21/207 280/730.1 |

(Continued)

FOREIGN PATENT DOCUMENTS

| DE | 198 59 988 A1 | 6/2000 |
| JP | 2000-344044 | 12/2000 |
| JP | 2913-18378 | 1/2013 |

*Primary Examiner* — Drew J Brown
(74) *Attorney, Agent, or Firm* — Oblon, McClelland, Maier & Neustadt, L.L.P.

(57) ABSTRACT

A vehicle occupant protection device including: an airbag constructed as an integrated bag body that is deployed in an area including a front side of a head portion of a vehicle occupant, and in an area including both left and right sides of the head portion of the vehicle occupant; and an airbag case that includes a box-shaped case main body provided on a seat rear side of a headrest main body, in which the airbag is housed in a folded state, and whose upper portion opens up during an inflation and deployment of the airbag, and a reaction force plate that is provided in a lower portion side of the case main body, and is formed by a component having greater rigidity than the case main body, and that supports the airbag from the seat rear side during the inflation and deployment of the airbag.

6 Claims, 7 Drawing Sheets

(56) References Cited

U.S. PATENT DOCUMENTS

| | | | |
|---|---|---|---|
| 2016/0082915 A1* | 3/2016 | Madaras | B60R 21/231 |
| | | | 297/216.2 |
| 2016/0121839 A1* | 5/2016 | Ko | B60R 21/233 |
| | | | 280/730.1 |
| 2017/0136977 A1* | 5/2017 | Ohno | B60R 21/013 |
| 2017/0203711 A1* | 7/2017 | Ohno | B60R 21/203 |
| 2017/0282834 A1* | 10/2017 | Sugie | B60R 21/01512 |
| 2017/0282933 A1* | 10/2017 | Ohmi | B60R 21/23138 |
| 2017/0291564 A1* | 10/2017 | Ohmi | B60R 21/207 |
| 2017/0291565 A1* | 10/2017 | Yamamoto | B60R 21/207 |
| 2017/0297524 A1* | 10/2017 | Sugie | B60R 21/01554 |

* cited by examiner

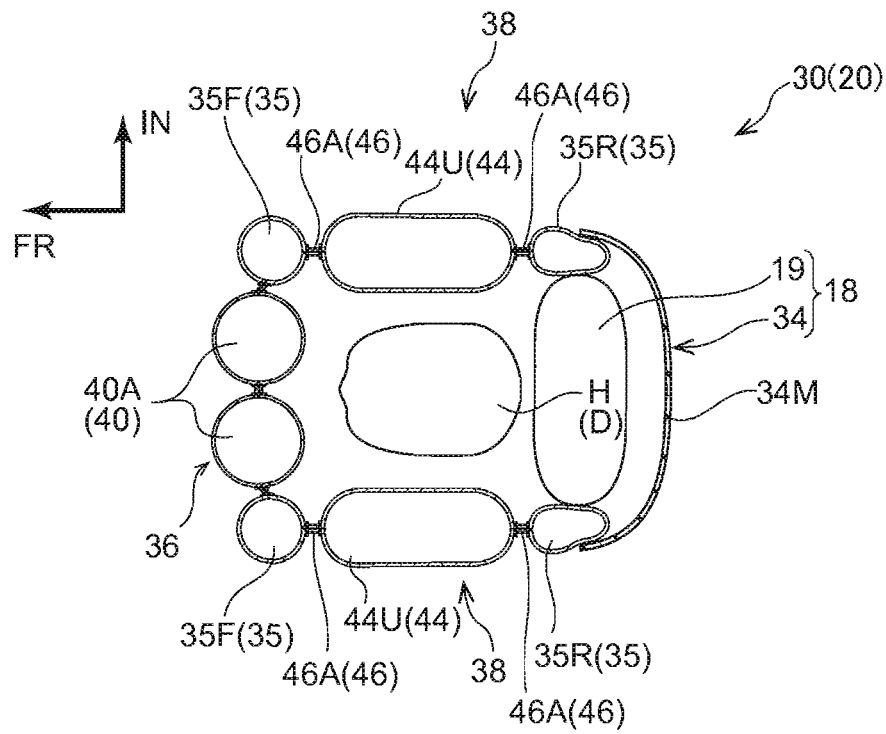
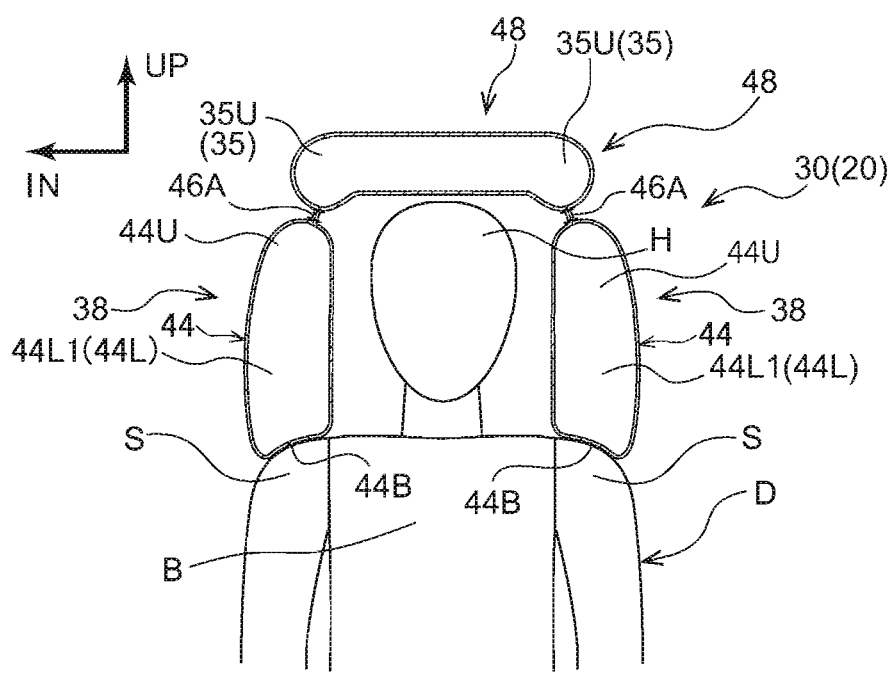

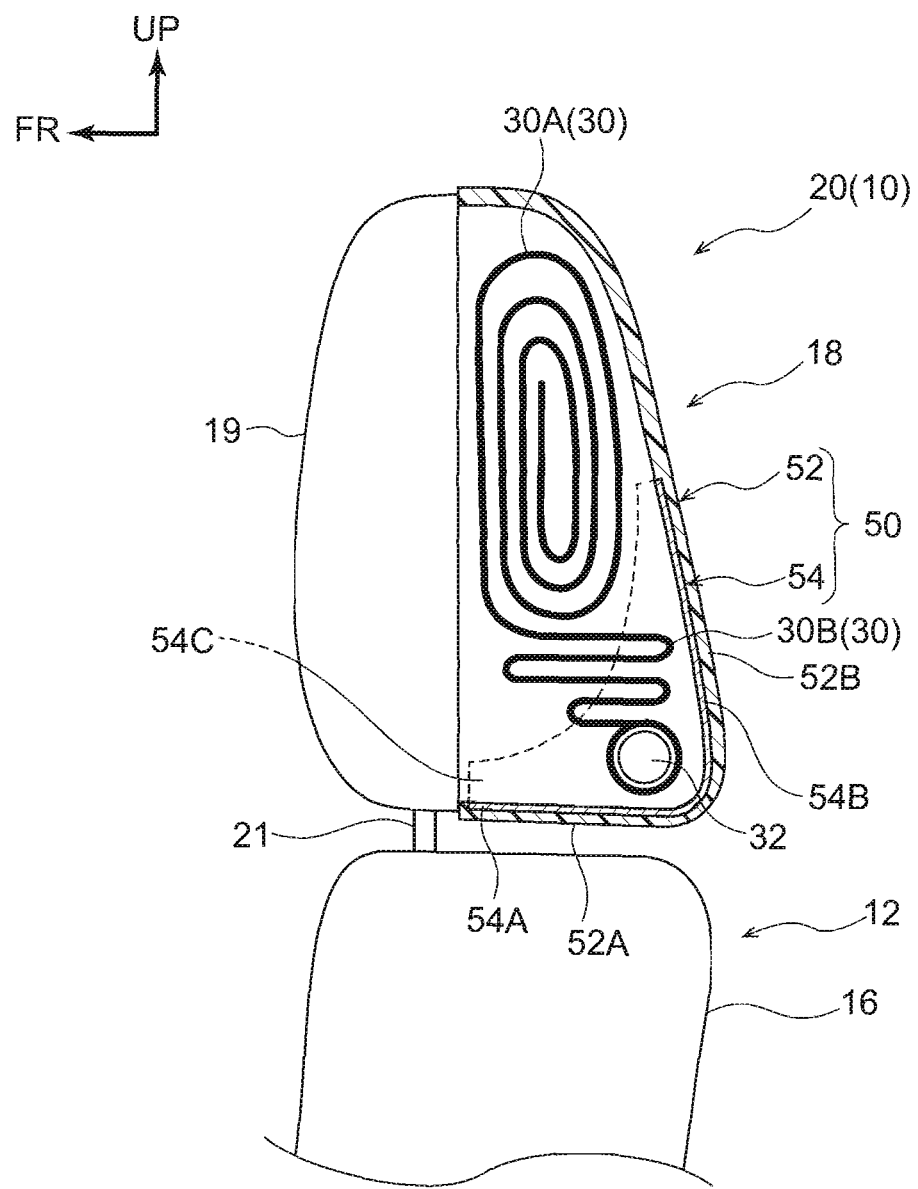

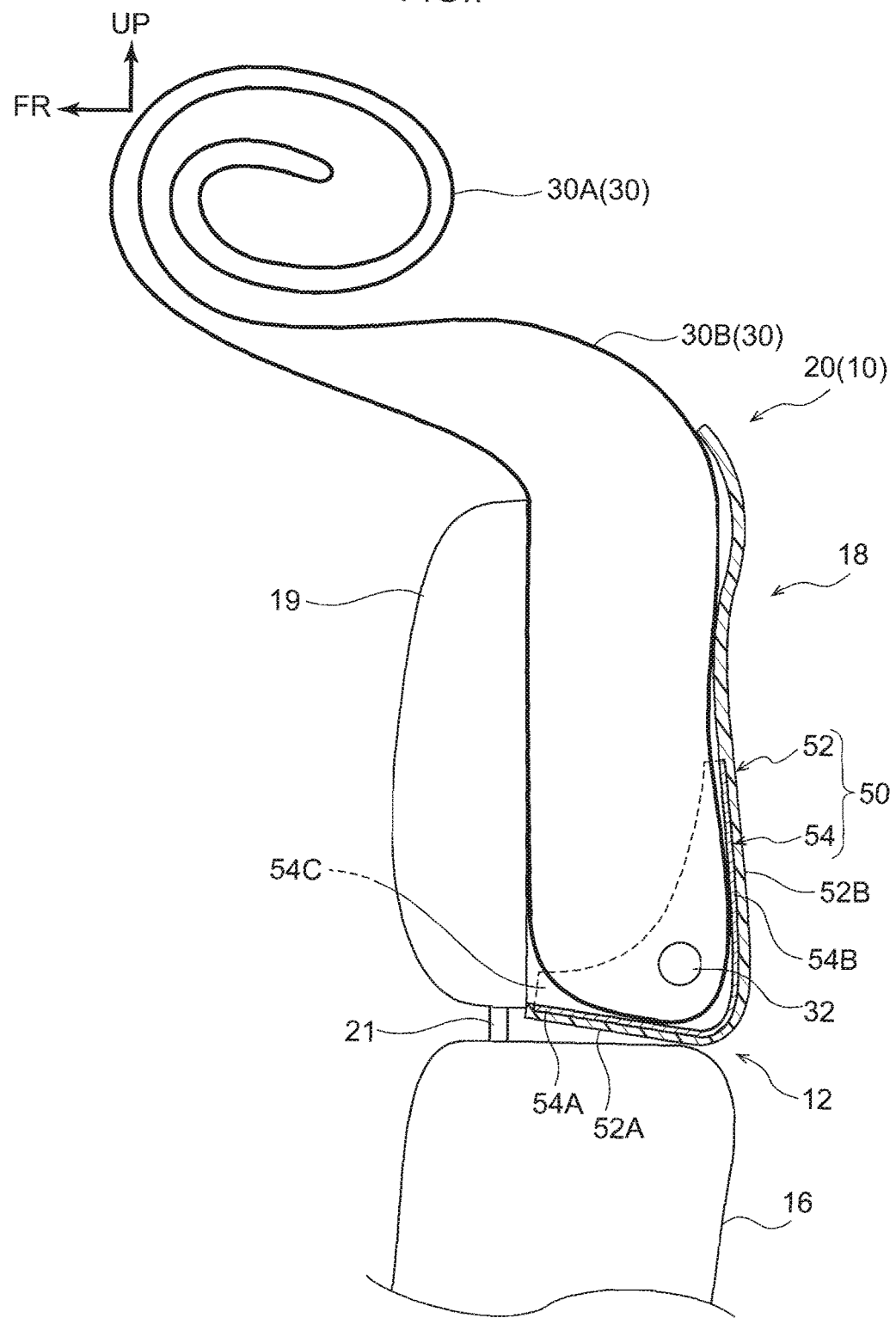

VEHICLE OCCUPANT PROTECTION DEVICE

CROSS-REFERENCE. TO RELATED APPLICATION

This application is based on and claims priority under 35 USC 119 from Japanese Patent Application No. 2015-237979 filed on Dec. 4, 2015, the disclosure of which is incorporated by reference herein.

BACKGROUND

Technical Field

The present invention relates to a vehicle occupant protection device.

Related Art

An airbag device is known (see Japanese Patent Application Laid-Open (JP-A) No. 2000-344044) that, in the event of a collision, supplies gas from an inflator through a gas supply pipe that is fixed to a seat back to a bag that is attached to the gas supply pipe, and causes this bag to inflate so as to cover a front and sides of a head portion of a vehicle occupant. In addition, an airbag device is known (see JP-A No. 2013-018378) in which an airbag for a head portion is deployed towards the front at left and right end portions of a seat headrest, and these join together at the front surface of the vehicle occupant head portion, while an auxiliary airbag for a head portion is deployed towards the front from a central portion of the seat headrest so as to join with the pair of head portion airbags. In addition to these, a structure in which an airbag that inflates so as to cover the front and sides of the head portion of a vehicle occupant is housed in a seat back is disclosed in German Patent Application Publication No. 19859988A1.

In the structure disclosed in JP-A No. 2000-344044, because the gas supply pipe is provided such that it protrudes above the seat back, it has an unattractive appearance and the gas supply pipe is an obstruction when the vehicle seat is being operated.

On the other hand, in the structure disclosed in JP-A No. 2013-018378, it is difficult to guarantee a satisfactory mutual join strength between the pair of head portion airbags that are joined together after being inflated and deployed, or a satisfactory join strength when the auxiliary head portion airbag is joined to the pair of head portion airbags.

As a measure to counter such drawbacks, consideration may be given to employing a structure in which an airbag that is formed as an integrated bag body is housed in a rearward side of a headrest main body, and this airbag is inflated and deployed so as to cover the head portion of a vehicle occupant from the front and from both the left and right sides. However, because the headrest main body is disposed in front of the airbag, there is a possibility that it will be difficult to make the airbag inflate and deploy on the seat front side, and the airbag will be badly obstructed by the head portion of the vehicle occupant or the vehicle cabin ceiling or the like when it passes over the headrest main body and the head portion of the vehicle occupant. Because of this, there is room for improvement from the standpoint of improving the deployment performance of the airbag.

SUMMARY

In consideration of the above-described circumstances, it is an object of the present invention to provide a vehicle occupant protection device that, in a structure in which an airbag which is constructed as an integrated bag body is housed in a folded state in rearward side of a headrest main body, makes it possible to improve the deployment performance of the airbag.

A vehicle occupant protection device according to a first aspect of the present invention includes an airbag that is inflated and deployed upon being supplied with gas, and that is constructed as an integrated bag body that is deployed in an area that includes a front side of a head portion of a vehicle occupant, and in an area that includes both left and right sides of the head portion of the vehicle occupant so as to cover the head portion, and also includes an airbag case that is constricted so as to include a box-shaped case main body that is provided on a seat rear side of a headrest main body which supports the head portion from the rear, and in which the airbag is housed in a folded state, and that is formed from resin, and whose upper portion opens up during an inflation and deployment of the airbag, and so as to include a reaction force plate that is provided in a lower portion side of the case main body, and is formed by a component having greater rigidity than the case main body, and that supports the airbag from the seat rear side during the inflation and deployment of the airbag.

In the vehicle occupant protection device according to the first aspect of the present invention, an airbag case is provided on the seat rear side of the headrest main body, and an airbag is housed in a folded state inside this airbag case. Here, the airbag is constructed as an integrated bag body that is deployed in an area that includes a front side of a head portion of a vehicle occupant, and in an area that includes both left and right sides of the head portion of the vehicle occupant so as to cover the head portion, and inflates and deploys upon being supplied with gas. As a consequence, the head portion of the vehicle occupant is restrained and protected by the airbag in various different types of collision.

Moreover, the airbag case is provided with a box-shaped case main body that is formed from resin, and this case main body is formed such that an upper portion thereof is opened up when the airbag is inflated and deployed. In addition, a reaction plate that is formed by a component having greater rigidity than the case main body is provided in the lower portion side of the case main body, and the airbag is supported from the seat rear side by this reaction force plate when the airbag is being inflated and deployed. As a consequence, reaction force towards the seat front side is applied from the reaction force plate to the airbag, and it becomes easy to make the airbag inflate and deploy towards the seat front side from the upper portion of the case main body.

A vehicle occupant protection device according to a second aspect of the present invention is characterized in that, in the structure according to the first aspect, the reaction force plate is provided with a rear wall reinforcement portion that is disposed in parallel with a rear wall of the case main body, and side wall reinforcement portions that extend towards the seat front side in parallel with side walls of the case main body from both sides in the seat transverse direction of the rear wall reinforcement portion, and seat front sides of the side wall reinforcement portions either slope or are curved such that, when viewed from the seat transverse direction, a lower portion of each side wall reinforcement portion is located closer to the seat front side than an upper portion of each side wall reinforcement portion.

In the vehicle occupant protection device according to the second aspect of the present invention, during the inflation and deployment of the airbag, reaction force towards the seat front side is applied to the airbag from the rear wall reinforcement portion that is disposed in parallel with a rear wall of the case main body. Here, side wall reinforcement portions extend towards the seat front side in parallel with side walls of the case main body from both sides in the seat transverse direction of the rear wall reinforcement portion. As a consequence, compared with a structure in which the side wall reinforcement portions are not provided, it is possible to increase the rigidity of the reaction force plate, and to increase the reaction force that is applied to the airbag.

Moreover, the seat front sides of the side wall reinforcement portions of the reaction force plate either slope or are curved such that, when viewed from the seat transverse direction, a lower portion of each side wall reinforcement portion is located closer to the seat front side than an upper portion of each side wall reinforcement portion. As a consequence of this, it is possible to reduce the surface area of the side wall reinforcement portions, while securing sufficient rigidity in the lower portion of the reaction force plate, and to prevent the reaction force plate from interfering with the airbag when this is inflated and deployed in the seat transverse direction from the case main body.

A vehicle occupant protection device according to a third aspect of the present invention is characterized in that, in the structure according to the first or second aspects, the airbag is constructed so as to include an outward roll-fold portion that is folded into a roll shape that is rolled up from a front end side of the airbag when this is in a deployed state towards an outer surface side, and is housed in the airbag case in this state, and a bellows-fold portion that is folded into a bellows fold underneath the outward roll-fold portion, and is housed in the airbag case in this state, wherein the outward roll-fold portion is housed in a location where, when viewed from the seat transverse direction, it does not overlap with the side wall reinforcement portions.

In the vehicle occupant protection device according to the third aspect of the present invention, when gas is supplied to the airbag, the outward roll-fold portion is inflated and deployed towards the seat front side over the top of the headrest main body and the vehicle occupant as the outward roll-fold is unwound. Here, because the outward roll-fold portion is housed in a location where, when viewed from the seat transverse direction, it does not overlap with the side wall reinforcement portions of the reaction force plate, it is possible to prevent the inflation and deployment of the outward roll-fold portions from being obstructed by the side wall reinforcement portions.

As has been described above, according to the vehicle occupant protection device according to the first aspect of the present invention, the excellent effect is achieved that, in a structure in which an airbag which is constructed as an integrated bag body is housed in a folded state in a rearward side of a headrest main body, it is possible to improve the deployment performance of the airbag.

According to the vehicle occupant protection device according to the second aspect of the present invention, the excellent effect is achieved that it is possible to cause an airbag to inflate and deploy effectively in a seat transverse direction at the same time as the reaction force applied to the airbag is increased.

According to the vehicle occupant protection device according to the third aspect of the present invention, the excellent effect is achieved that it is possible to cause the outward roll-fold portion to inflate and deploy towards the seat front side in such a way that it passes rapidly over a headrest main body and the head portion of a vehicle occupant.

BRIEF DESCRIPTION OF THE DRAWINGS

Exemplary embodiments of the present invention will be described in detail based on the following figures, wherein:

FIG. 3A is a view showing an inflated and deployed state of a multi-directional airbag that forms part of a vehicle occupant protection device according to a first exemplary embodiment, and is a cross-sectional view taken along a line 3A-3A in FIG. 1;

FIG. 3B is a view showing an inflated and deployed state of a multi-directional airbag that forms part of the vehicle occupant protection device according to the first exemplary embodiment, and is a cross-sectional view taken along a line 3B-3B in FIG. 1;

FIG. 6 is an enlarged typical side view showing in a partially cutaway state an enlargement of a headrest according to an exemplary embodiment, and shows a state prior to an airbag being inflated and deployed; and FIG. 7 is an enlarged typical side view showing in a partially cutaway state an enlargement of a headrest according to an exemplary embodiment, and shows a state immediately after an airbag has been inflated and deployed.

DETAILED DESCRIPTION

Figure 1:
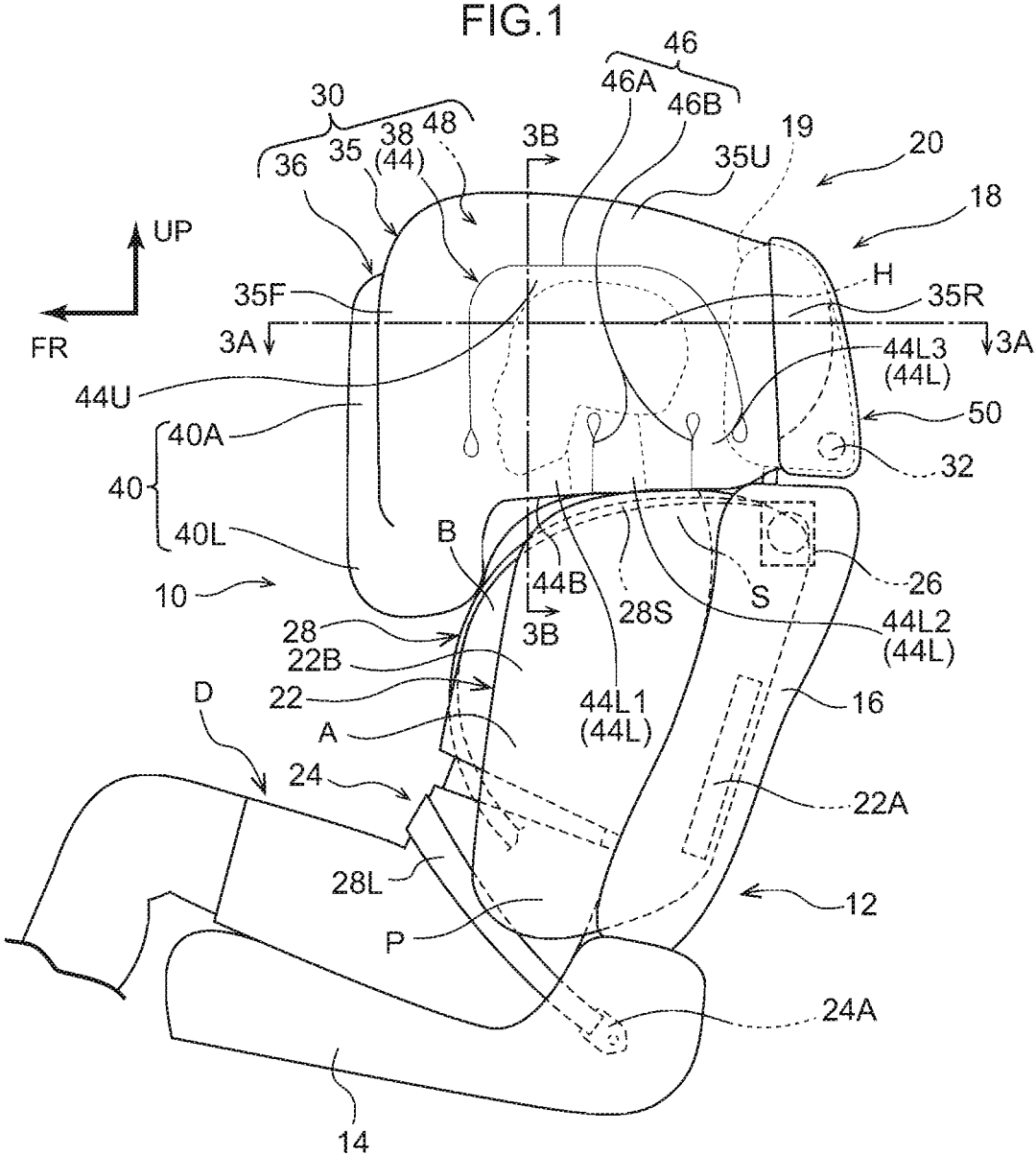
FIG. 1 is a side view showing in typical an operating state of a vehicle occupant protection device according to an exemplary embodiment.

A vehicle occupant protection device 10 according to an exemplary embodiment of the present invention will now be described based on FIG. 1 through FIG. 7. Note that an arrow FR and an arrow UP that are shown where appropriate in the drawings respectively indicate a forward direction of a vehicle seat 12 (i.e., a direction in which a seated person faces), and an upward direction. Hereinafter, unless specifically stated otherwise, if simple front-rear, up-down, or left-right directions are used, then these refer respectively to the front-rear directions of the seat, the up-down directions of the seat, and the left-right directions when facing towards the front in the seat front-rear direction. Note also that, in this exemplary embodiment, the front-rear direction of the vehicle seat 12 matches the front-rear direction of a vehicle, the up-down direction of the vehicle seat 12 matches the up-down direction of a vehicle, and the seat transverse direction of the vehicle seat 12 matches the vehicle transverse direction. Furthermore, an arrow IN which is shown where appropriate in the drawings shows a vehicle center side in the vehicle transverse direction of an automobile that is serving as a vehicle in which the vehicle seat 12 has been installed.

(Overall Schematic Structure of a Vehicle Occupant Protection Device)

As is shown in FIG. 1, the vehicle occupant protection device 10 is mounted in the vehicle seat 12. The vehicle seat 12 is disposed in a position that is offset to either the left side or right side (to the left side in the present exemplary embodiment) relative to the center in the vehicle transverse direction of a vehicle body of an automobile (not shown in the drawings). This vehicle seat 12 is constructed so as to include a seat cushion 14, a seat back 16 whose bottom end is coupled to a rear end of the seat cushion 14, and a headrest 18 that is provided at an upper end of the seat back 16.

Note that, in FIG. 1 through FIG. 4B, a state is shown in which a collision test dummy D is seated on the seat cushion 14 of the vehicle seat 12 so as to serve as a model of the vehicle occupant who is to be protected. This dummy D is, for example, a World SID (Internationally integrated side impact dummy: World Side Impact Dummy) AM50 (i.e., the 50th percentile of American adult males). This dummy D is seated in a standard sitting posture (i.e., in a normal state) that is determined using a collision test method. The vehicle seat 12 is located in a reference set position that corresponds to the aforementioned sitting posture. Note that a head portion H of the dummy D is a portion above the neck and including the face, and the face faces towards the vehicle front side (i.e., the seat front side). Hereinafter, the dummy D will be referred to as the 'vehicle occupant D' in order to simplify the description.

Figure 2:
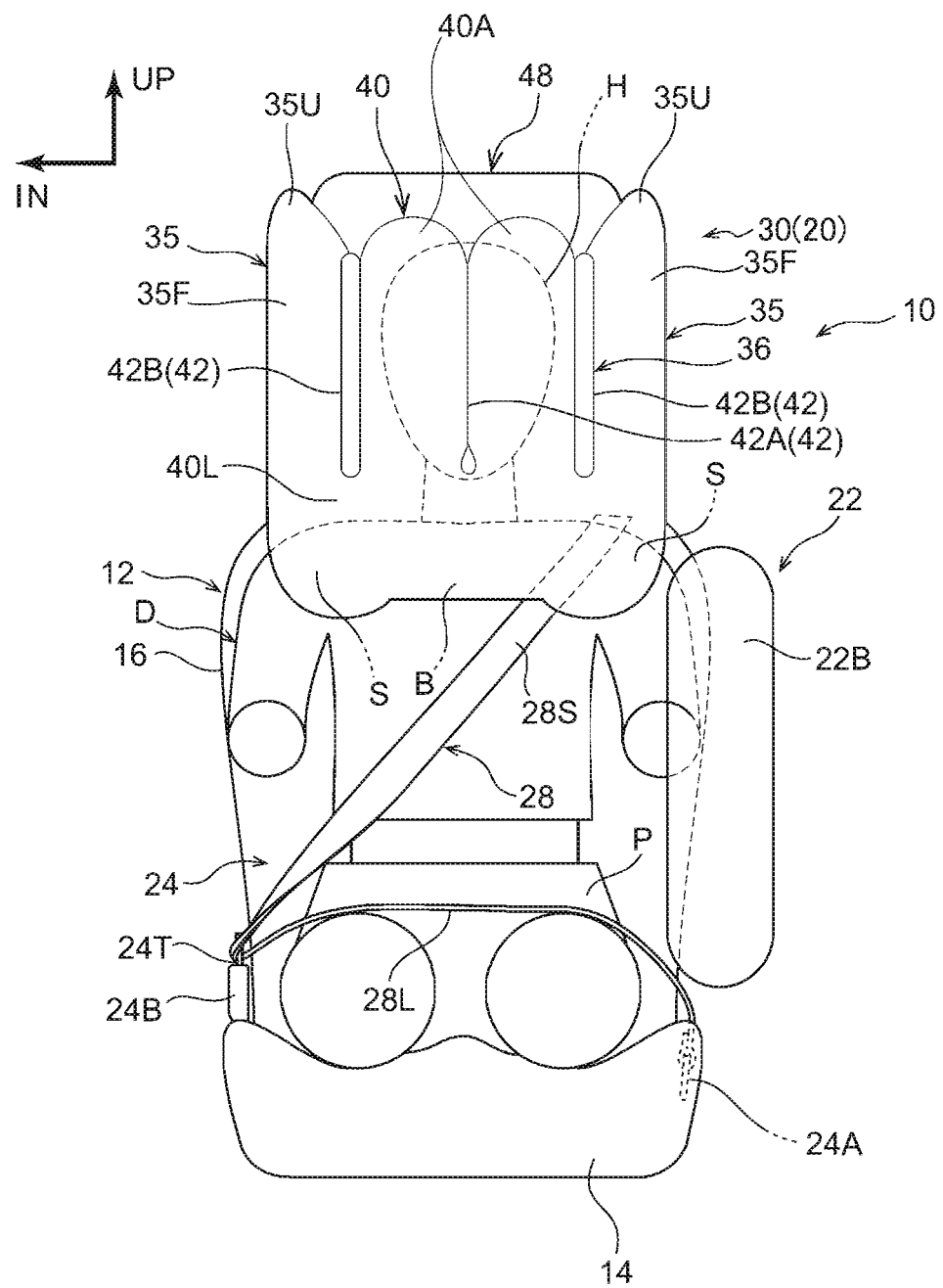
FIG. 2 is a front view showing in typical form an operating state of a vehicle occupant protection device according to an exemplary embodiment.

As is shown in FIG. 1 and FIG. 2, the vehicle occupant protection device 10 is constructed so as to include a multidirectional airbag device 20 that is intended to protect the vehicle occupant D from various types of collision, a side airbag device 22, and a seatbelt device 24. Hereinafter, the schematic structure of the seatbelt device 24 and the side airbag device 22 will be described, and thereafter the detailed structure of the multidirectional airbag device 20 will be described.

The seatbelt device 24 is a three-point type of seatbelt device. One end of a belt (i.e., a webbing) 28 is wound onto a retractor 26 such that it is able to be unwound therefrom, while another end of the belt 28 is fixed to an anchor 24A. A tongue plate 24T is provided such that it is able to slide along the belt 28, and the vehicle occupant D puts on the belt 28 by engaging this tongue plate 24T with a buckle 24B. When the belt 28 is being worn by the vehicle occupant D, it includes a shoulder belt 28S that fits around an upper body of the vehicle occupant D, and a lap belt 28L that extends from the tongue plate 24T to the anchor 24A and fits around the waist portion of the vehicle occupant D.

In the present exemplary embodiment, the seatbelt device 24 is formed as what is known as a 'seatbelt device with attached seat' in which the retractor 26, the anchor 24A, and the buckle 24B are provided on the vehicle seat 12. Moreover, in this exemplary embodiment, when operated, the retractor 26 also has a pretensioner function whereby it forcibly retracts the belt 28. Operations of the pretensioner function of the retractor 26 are controlled by an ECU (Electronic Control Unit) 60 (described below—see FIG. 4A).

The airbag device 22 is constructed so as to include an inflator 22A and a side airbag 22B, and is housed in a side portion on the outer side in the vehicle transverse direction of the seat back 16 with the side airbag 22B in a folded state. When the inflator 22A is operated, it generates gas inside the side airbag 22B. According to this structure, this gas causes the side airbag 22B to protrude towards the front from the side portion of the seat back 16, and to inflate and deploy on the outer side in the vehicle transverse direction relative to the vehicle occupant D. In this exemplary embodiment, the side airbag 22B is constructed such that it is inflated and deployed on the outer side in the vehicle transverse direction of a pelvic portion P, an abdominal portion A, a breast portion B, and a shoulder portion S of the vehicle occupant D. Operations of the inflator 22A are also controlled by the ECU 60 (described below—see FIG. 4A).

(Multi-Directional Airbag Device Structure)

As is shown in FIG. 1 through FIG. 3B, the multi-directional airbag device 20 is constructed so as to include a multi-directional airbag 30, which serves as an airbag, an inflator 32, and an airbag case 50. The multi-directional airbag device 20, which is formed having a modular structure, is provided on the seat rearward side of the headrest 18 above the seat back 16.

The multi-directional airbag 30 is constructed as a single integrated bag body that is inflated and deployed so as to cover the head portion H of the vehicle occupant D (hereinafter, this will usually be referred to simply as the 'head portion H') from the front and from both the left and right sides thereof. More specifically, the multi-directional airbag 30 is constructed so as to include a pair of left and right frame ducts 35 that are inflated and deployed at a distance from each other in an area that includes both the left and right sides and the top of the head portion H, a forward-deploying portion 36 that deploys in an area that includes the front of the head portion H, a pair of side-deploying portions 38 that deploy in an area that includes the both the left and right sides of the head portion H, and an upward-deploying portion 48 that deploys in an area that includes the top of the head portion H.

The frame ducts 35 are provided as a pair with one frame duct 35 being provided on each side in the seat transverse direction of the head portion H, and are constructed such that each frame duct 35 inflates and deploys substantially in a U-shape that is open in a downward direction when seen in a side view. Specifically, when seen in a side view, in an inflated and deployed state, the frame ducts 35 include a rear duct 35R that extends vertically in parallel with the head rest 18, an upper duct 35U that extends towards the front from an upper end of the rear duct 35R, and a front duct 35F that hangs downwards from a front end of the upper duct 35U.

The forward-deploying portion 36 is constructed so as to include a forward-inflating portion 40 that includes a portion that is deployed to the front of the head portion H, and non-inflating portions 42 that divide the forward-inflating portion 40 into a plurality of inflating portions. In this exemplary embodiment, the forward-inflating portion 40 is constructed so as to include a pair of up-down inflating portions 40A that are inflated and deployed adjacently to each other in the seat transverse direction such that the longitudinal direction of each up-down inflating portion 40A is aligned with the up-down direction, and a lower inflating portion 40L that is located underneath the pair of up-down inflating portions 40A. The pair of up-down inflating portions 40A are constructed such that they inflate and deploy at the front (i.e., at a front surface) of the head portion H, while the lower inflating portion 40L is constructed such that it inflates and deploys at the front of the breast portion B and the shoulder portions S of the vehicle occupant D.

The non-inflating portions 42 are constructed so as to include a non-inflating portion 42A that divides the pair of up-down inflating portions 40A in the seat transverse direction, and non-inflating portions 42B that are interposed between the respective up-down inflating portions 40A and the front ducts 35F of the frame duct 35. In this exemplary embodiment, the non-inflating portion 42A is formed by a linear seam that extends up and down, while the non-inflating portions 42B are each formed as a portion that is surrounded by a toroidal (i.e., endless) seam that extends up and down.

The side-deploying portions 38 are constructed so as to include side-inflating portions 44 that, upon being supplied with gas, are inflated and deployed at the sides of the head portion H, and non-inflating portions 46 that divide the side-inflating portions 44 into a plurality of inflating portions. In this exemplary embodiment, in an inflated and deployed state, the side-deploying portions 38 are surrounded on three sides, namely, the rear, the top, and the front by the frame duct 35, so as to be formed substantially in a rectangular shape when seen in a side view. The side-deploying portions 38 have a sufficiently large size (i.e., surface area) to enable them to wrap around substantially the entire head portion H when seen in a side view. The side-inflating portions 44 of the side-deploying portions 38 are partitioned from the frame duct 35 by a U-shaped seam 46A which is one of the seams of the non-inflating portions 46, and which is formed in an inverted U shape that is open towards the bottom. In this exemplary embodiment, front end sides of the side-inflating portions 44 of the side-deploying portions 38 are connected indirectly to the forward-inflating portion 40 via the front ducts 35F of the frame ducts 35.

The non-inflating portions 46 are constructed so as to include a pair of front and rear vertical seams 46B that extend from a bottom edge of the side-inflating portion 44 to an interior of an aperture in the U-shaped seam 46A. The pair of vertical seams 46B are constructed such that they divide a lower portion 44L of each side-inflating portion 44 into three inflating portions 44L1, 44L2, and 44L3 that are inflated and deployed adjacently to each other in the front-rear direction. As a result of the lower portion 44L of the side-inflating portions 44 being divided in this manner into the three inflating portions 44L1 through 44L3, the front-rear length in a planar cross-sectional view of the lower portion 44L of each side-inflating portion 44 in an inflated and deployed state is made shorter than the front-rear length in a planar cross-sectional view of the upper portion 44U of each side-inflating portion 44.

In the left and right side-deploying portions 38, when the multi-directional airbag 30 is in an inflated and deployed state, the lower ends 44B of the respective side-inflating portions 44 are in contact with a top of the shoulder portions S of the vehicle occupant D. In this structure, the position in the up-down direction of the multi-directional airbag 30 in an inflated and deployed state relative to (the head portion H of) the vehicle occupant D is determined by this contact of the lower end 44B of each side-deploying portion 44 with the shoulder portions S. The multi-directional airbag 30 is constructed such that, when in this positioned state, none of the forward-deploying portion 36, the left and right side deploying portions 38, and the upward-deploying portion 48 (described below) come into contact with the head portion H of the vehicle occupant D (i.e., such that a gap is formed between them) when the vehicle occupant D is seated in the standard sitting posture.

The upward-deploying portion 48 is a deployment portion that, with the seat transverse direction taken as the longitudinal direction thereof, inflates and deploys above the head portion H. A seam (not shown in the drawings), which is a non-inflating portion, is provided in the upward-deploying portion 48, and the thickness in the seat up-down direction of the upward-deploying portion 48 is restricted by this seam.

The multi-directional airbag device 30 that is constructed in the above-described manner is formed, as an example, as an integrated bag body by an OPW (One Piece Woven). As is shown in FIG. 6, the multi-directional airbag 30 is housed in a folded state inside an airbag case 50 (described below). Specifically, when housed within the airbag case 50, the multi-directional airbag 30 is constructed so as to include an outward roll-fold portion 30A that is folded in an outwards roll-fold, and a bellows-fold portion 30B that is folded in a bellows fold. The outward roll-fold portion 30A is folded into a roll shape that is rolled up from a front end side of the multi-directional airbag 30 when this is in a deployed state towards an outer surface side of the forward-deploying portion 36, and is folded in such a way that, during inflation and deployment, it is easily able to be deployed towards the seat front side. The bellows-fold portion 30B is located underneath the outward roll-fold portion 30A, and is constructed such that gas supplied from the inflator 32 flows to the outward roll-fold portion 30A via the bellows-fold portion 30B. Note that it is also possible, for example, to form the multi-directional airbag 30 as an integrated bag body by cutting and sewing peripheral edges of two pieces of woven cloth.

Figure 4A:
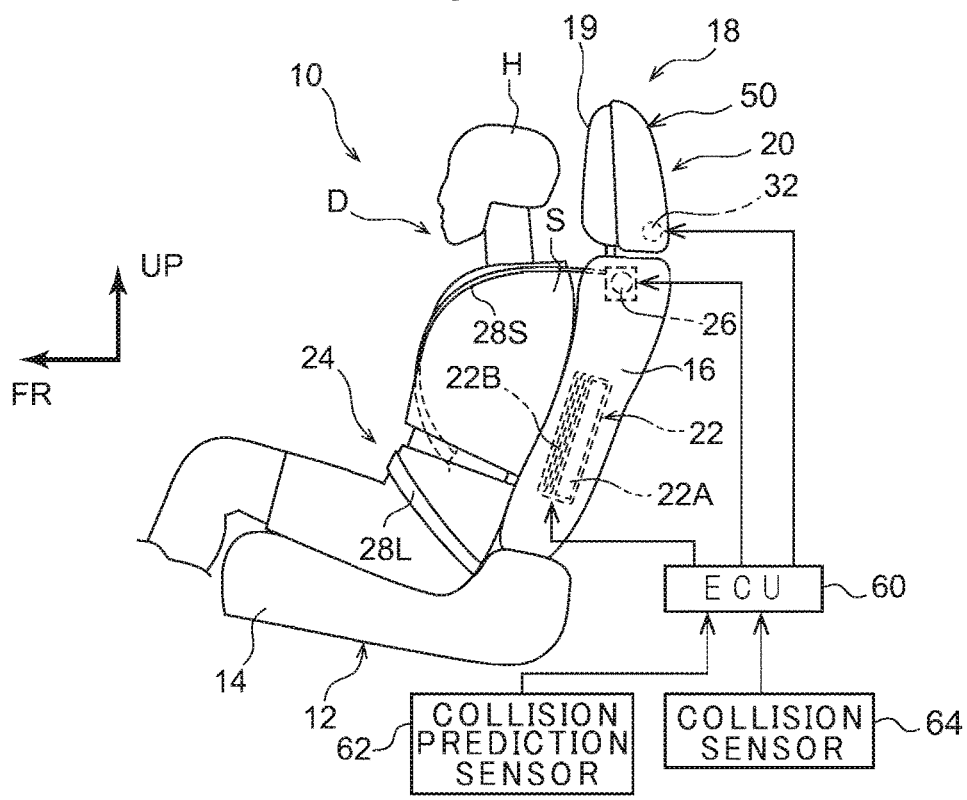
FIG. 4A is a side view showing the schematic overall structure prior to operation of a vehicle occupant protection device according to an exemplary embodiment.

As is shown in FIG. 1, the inflator 32 is provided together with the multi-directional airbag 30 inside the airbag case 50. A combustion-type or cold gas-type of inflator is employed as the inflator 32, and the gas that is generated as a result of the inflator 32 being operated is supplied to the interior of the multi-directional airbag 30. The inflator 32 of the present exemplary embodiment is a cylinder-type of inflator, and is disposed such that a longitudinal direction thereof extends in the seat transverse direction. Furthermore, as is shown in FIG. 4A, operations of the inflator 32 are controlled by the ECU 60 serving as a control device.

(ECU Structure)

The ECU 60 is electrically connected to the retractor 26 of the seatbelt device 24, the inflator 22A of the side airbag device 22, and the inflator 32 of the multi-directional airbag device 20. Moreover, the ECU 60 is also electrically connected to a collision prediction sensor 62 such as a pre-crash sensor and to a collision sensor 64.

Based on signals from the collision prediction sensor 62, the ECU 60 is able to predict whether or not various types of collision are unavoidable for that vehicle. The collision prediction sensor 62 is constructed, for example, so as to include a stereo camera (not shown in the drawings) that is provided adjacent to the center in the vehicle transverse direction of an upper portion of the windshield glass. An area in the front of the vehicle is photographed by this stereo camera, and objects that may collide with the vehicle are detected. In addition, the distance to a collision object detected by the stereo camera, and the relative speed between the vehicle and the collision object are also measured, and this measurement data is output to the ECU 60. Based on this measurement data from the stereo camera, the ECU 60 determines whether or not a collision with the vehicle is unavoidable. Note that a milliwave radar or the like may be used for the collision prediction sensor 62.

When the ECU 60 has detected a vehicle collision based on a signal from the collision sensor 64, it causes a pretensioner mechanism of the retractor 26 to be operated, and also causes the inflator 32 to be operated. As a consequence, gas generated by the inflator 32 is supplied to the multi-directional airbag 30. Note that, as an example, the collision sensor 64 is constructed so as to include a front satellite sensor that is formed by an acceleration sensor that is disposed on a front side member, and a floor sensor that is formed by an acceleration sensor that is disposed on the floor underneath the center console.

(Structure of the Airbag Case 50)

Figure 5:
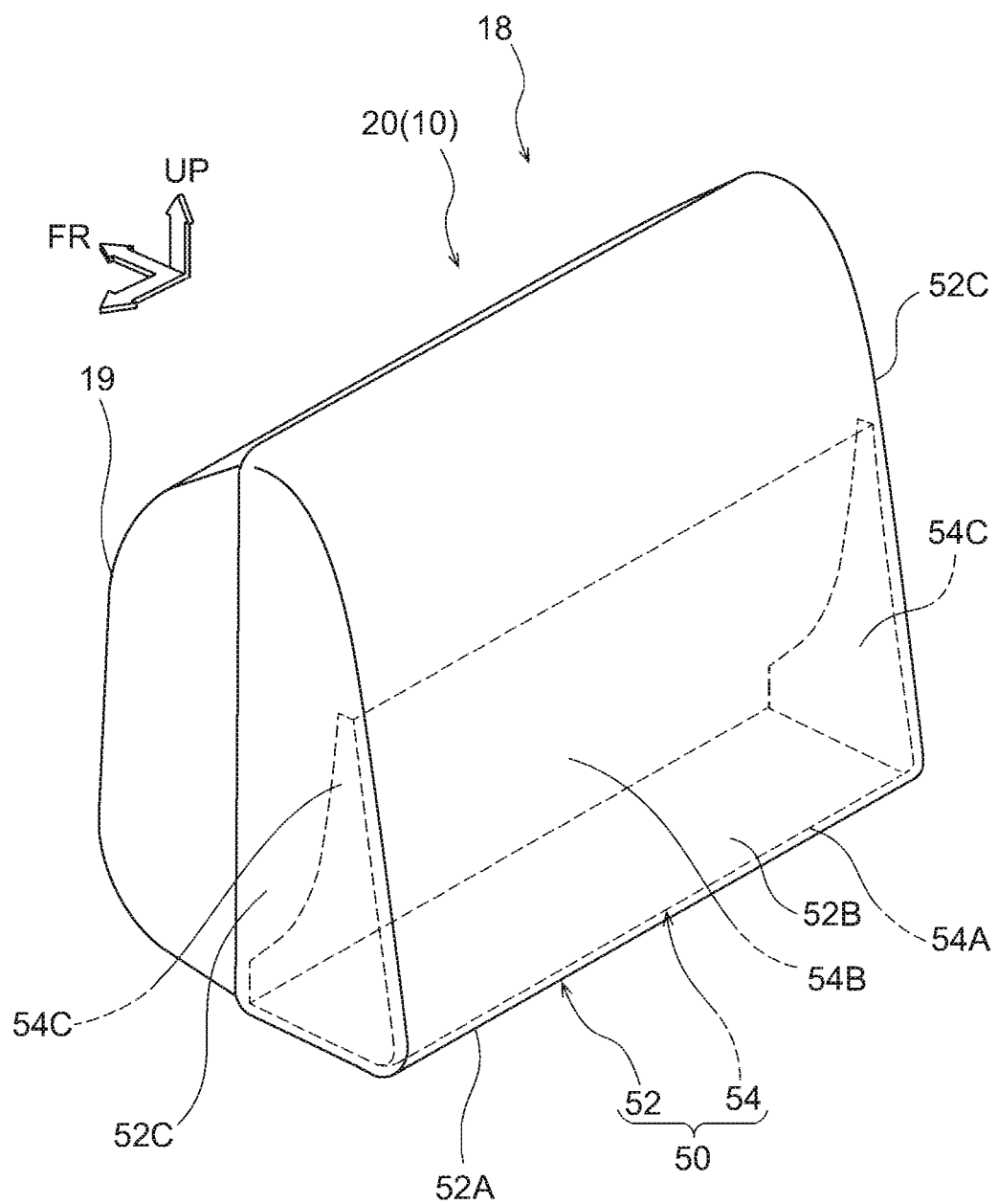
FIG. 5 is an enlarged perspective view showing in typical form an enlargement of a headrest according to an exemplary embodiment.

Next, the structure of the airbag case 50 will be described. As is shown in FIG. 5, the airbag case 50 is provided in a seat rear side of a headrest main body 19 that forms part of the headrest 18. The headrest main body 19 is disposed at the rear of the head portion H of the vehicle occupant D so as to be able to support the head portion H of the vehicle occupant D from the rear, and is internally provided with cushioning material. The headrest main body 19 is joined via stays 21 to the seat back 16 (see FIG. 1).

The airbag case 50 which is provided on the seat rear side of the headrest main body 19 is constructed so as to include a case main body 52 and a reaction force plate 54. The case main body 52 is formed from resin substantially in a box shape, and also functions as a decorative cover for a rear portion of the headrest 18. The case main body 52 is constructed so as to include a lower wall 52A, a rear wall 52B, and a pair of left and right side walls 52C.

The lower wall 52A is located at the same height as a lower surface of the headrest main body 19, or alternatively slightly on the seat lower side of the lower surface of the headrest main body 19, and is disposed such that it faces an upper end of the seat back 16. In addition, the lower wall 52A is also formed slightly wider in the seat transverse direction than the headrest main body 19, and both end portions in the seat transverse direction of the lower wall 52A are located on the outer side in the seat transverse direction of the headrest main body 19.

The rear wall 52B extends towards the seat upper side from a rear end portion of the lower wall 52A, and in a side view looking from the seat transverse direction, slopes gradually towards the rear as it moves from the upper side towards the lower side. Moreover, a top end of the rear wall 52B curves towards the headrest main body 19 (see FIG. 6).

The pair of left and right side walls 52C extend towards the seat upper side from both end portions in the seat transverse direction of the lower wall 52A, and this pair of side walls 52C are disposed facing each other in the seat transverse direction. Rear edges of each of the pair of side walls 52C are joined respectively to the rear wall 52B, and in a side view looking from the seat transverse direction, are formed such that they slope gradually towards the rear as they move from the upper side towards the lower side.

Figure 4B:
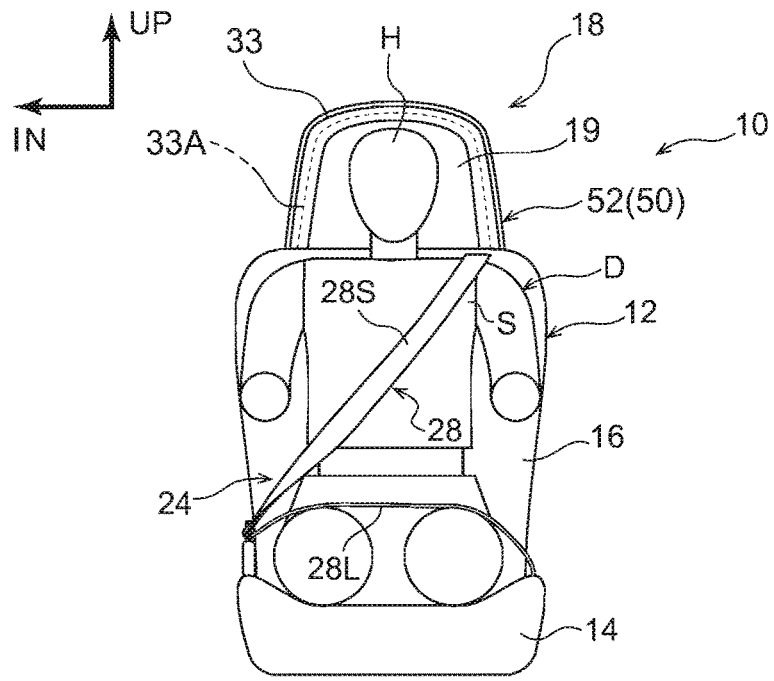
FIG. 4B is a front view showing the schematic overall structure prior to operation of a vehicle occupant protection device according to an exemplary embodiment.

As is described above, the case main body 52 is formed substantially in a box shape that is open on the seat forward side, and a space is provided between the case main body 52 and the headrest main body 19 where the multi-directional airbag 30 is housed. Moreover, as is shown in FIG. 4B, the aperture on the seat front side of the case main body 52 is closed off by an airbag door 33. In the present exemplary embodiment, when seen in a front view, the space between the airbag case 50 and the headrest main body 19 is closed off by the airbag door 33, and a structure is employed in which, triggered by a tear line 33A, the airbag door 33 is split open by inflation pressure from the multi-directional airbag 30 so that the multi-directional airbag 30 is allowed to inflate and deploy towards the front.

As is shown in FIG. 5, the case main body 52 is formed from resin as a single body, and the reaction force plate 54 is formed integrally with the case main body 52 on the lower portion side thereof. The reaction force plate 54 is formed by a component having greater rigidity than the case main body 52, and in the present exemplary embodiment, as an example, is made from metal. The reaction force plate 54 is formed integrally with the case main body 52 by being insert-molded inside the case main body 52. The reaction force plate 54 is constructed so as to include a lower wall reinforcement portion 54A, side wall reinforcement portions 54C, and a rear wall reinforcement portion 54B.

The lower wall reinforcement portion 54A is disposed inside the lower wall 52A of the case main body 52, and is formed slightly smaller than the lower wall 52A. The rigidity of the lower surface of the airbag case 50 is increased by this lower wall reinforcement portion 54A.

The rear wall reinforcement portion 54B extends from a rear end of the lower wall reinforcement portion 54A in parallel with the rear wall 52B of the case main body 52 towards the seat upper side, and is disposed inside the rear wall 52B. A top end portion of the rear wall reinforcement portion 54B is located slightly on the seat upper side of an intermediate portion in the seat up-down direction of the rear wall 52B, and the rear wall reinforcement portion 549 does not extend as far as the upper portion of the rear wall 52B. The rigidity of the lower portion side of the rear surface of the airbag case 50 is increased by this rear wall reinforcement portion 54B.

The side wall reinforcement portions 54C extend from both sides in the seat transverse direction of the rear wall reinforcement portion 54B in parallel with the side walls 52C of the case main body 52 towards the seat front side, and are disposed inside the side walls 52C of the case main body 52. Lower ends of the side wall reinforcement portions 54C are joined to the lower wall reinforcement portion 54A. Furthermore, seat front sides of the side wall reinforcement portions 54C either slope or are curved such that, when viewed from the seat transverse direction, a lower portion thereof is located closer to the seat front side than an upper portion thereof. The seat front sides of the side wall reinforcement portions 54C of the present exemplary embodiment are curved such that a lower portion thereof is located closer to the seat front than an upper portion thereof. Because of this, the side wall reinforcement portions 54C are formed in a substantially triangular shape in which, when viewed from the seat transverse direction, a corner portion on the front portion side and the top portion side of the rectangle is cut away towards the inner side. Moreover, as is shown in FIG. 6, the side wall reinforcement portions 54C are Rained in a shape in which, when viewed from the seat transverse direction, they avoid the outward roll-fold portion 30A of the multi-directional airbag 30. In other words, the outward roll-fold portion 30A is housed in a position where it does not overlap with the side wall reinforcement portions 54C when viewed from the seat transverse direction.

The rigidity of the lower portion side of the case main body 52 is increased by the reaction force plate 54 which is constructed in the manner described above. Moreover, as is shown in FIG. 7, during the inflation and deployment of the multi-directional airbag 30, the upper portion of the airbag case 50 where the reaction force plate 54 is not provided is opened up by inflation pressure, and is deformed towards the seat rear side. As a consequence, a structure is created in which the multi-directional airbag 30 is deployed towards the seat front side.

(Operation and Effects)

Next, an operation of the exemplary embodiment will be described.

In the vehicle occupant protection device 10 of the present exemplary embodiment, the metal reaction force plate 54 is provided on the lower portion side of the case main body 52 of the airbag case 50, and the rigidity of the lower portion side of the case main body 52 is increased by this reaction force plate 54. As a consequence, when the upper portion of the airbag case 50 is opened by the inflation pressure of the multi-directional airbag 30, it is possible to prevent the lower portion side of the case main body 52 from deforming towards the seat rear side. In addition, because the multi-directional airbag 30 is supported from the seat rear side by the rear wall reinforcement portion 54B of this reaction force plate 54, reaction force towards the seat front side is applied to the multi-directional airbag 30 from the rear wall reinforcement portion 54B. As a result, it is easy to make the multi-directional airbag 30 inflate and deploy towards the seat front side from the upper portion of the case main body 52. Namely, the deployment performance of the multi-directional airbag 30 can be improved.

Moreover, in the present exemplary embodiment, as is shown in FIG. 5, the side wall reinforcement portions 54C extend towards the seat front side in parallel with the side walls 52C of the case main body 52 from both sides in the seat transverse direction of the rear wall reinforcement portion 54B of the reaction force plate 54. As a consequence of this, it is possible to increase the flexural rigidity towards the seat rear side of the rear wall reinforcement portion 54 of the reaction force plate 54, and it is possible to prevent the lower portion of the rear surface of the airbag case 50 from deforming towards the rear side during the inflation and deployment of the multi-directional airbag 30. Moreover, the side wall reinforcement portions 54C either slope or are curved such that, when viewed from the seat transverse direction, a lower portion thereof is located closer to the seat front side than an upper portion thereof. As a consequence, compared with a structure in which the side wall reinforcement portions 54C are formed in a rectangular shape when viewed from the seat transverse direction, it is possible to reduce the surface area of the side wall reinforcement portions 54C, and to prevent the reaction force plate 54 from interfering with the multi-directional airbag 30 when this is inflated and deployed in the seat transverse direction from the case main body 52. In this manner, it is possible to prevent the inflation and deployment of the multi-directional airbag 30 being obstructed in the seat transverse direction and, at the same time, to increase reaction force applied to the multi-directional airbag 30.

Furthermore, in the present exemplary embodiment, because the outward roll-fold portion 30A is housed in a position where it does not overlap with the side wall reinforcement portions 54C of the reaction force plate 54 when viewed from the seat transverse direction, it is possible to prevent the inflation and deployment of at least the outward roll-fold portion 30A from being obstructed by the side wall reinforcement portions 54C. Moreover, the bellows-fold portion 30B is provided underneath the outward roll-fold portion 30A, and gas generated from the inflator 32 is supplied to the outward roll-fold portion 30A via the bellows-fold portion 30B. As a consequence, because the bellow-fold portion 30B is inflated and deployed before the outward roll-fold portion 30A, the outward roll-fold portion 30A is pushed upwards, and the outward roll-fold portion 30A can be rapidly inflated and deployed towards the seat front side of the headrest main body 19.

Furthermore, in the present exemplary embodiment, the multi-directional airbag 30 is constructed as an integrated bag body that is deployed in an area that includes the front side of the head portion H of the vehicle occupant D, and in an area that includes both the left and right sides thereof so as to cover the head portion H of the vehicle occupant D. As a consequence, in the event of a vehicle collision, because the head portion H of the vehicle occupant D is covered by the multi-directional airbag 30, it is possible to restrain and protect the head portion H of the vehicle occupant D in various different types of collision.

Moreover, in the present exemplary embodiment, the multi-directional airbag 30 is housed in the airbag case 50 which is provided on the seat rear side of the headrest main body 19. Because of this, compared with a structure in which, for example, a gas supply pipe that is disposed so as to surround the head portion H of the vehicle occupant D from above protrudes at all times into the vehicle cabin interior, it is possible to improve the pre-operating appearance, while guaranteeing a level of vehicle occupant protection equal to or surpassing that provided by the above structure. Moreover, adjustment of the front-rear position, adjustment of the height, and reclining operations and the like of the vehicle seat 12 are not obstructed by the multi-directional airbag device 20.

The vehicle occupant protection device 10 according to an exemplary embodiment of the present invention has been described above, however, it is to be understood that the present invention may be implemented in a variety of forms insofar as they do not depart from the spirit or scope of the present invention. For example, as is shown in FIG. 5, the reaction force plate 54 of the present exemplary embodiment is constructed so as to include the lower wall reinforcement portion 54A, the rear wall reinforcement portion 54B, and the side wall reinforcement portions 54C, however, the present invention is not limited to this. It is also possible for the reaction force plate 54 to be formed by only the lower wall reinforcement portion 54A and the rear wall reinforcement portion 54B. In this case, the side walls 52C of the case main body 52 may also be formed by resin components having a high degree of rigidity. Moreover, the reaction force plate 54 may also be formed by only the rear wall reinforcement portion 54B and the side wall reinforcement portions 54C.

Moreover, in the present exemplary embodiment, the seat front side of each side wall reinforcement portion 54C is curved such that a lower portion thereof is located closer to the seat front than an upper portion thereof when viewed from the seat transverse direction, however, the present invention is not limited to this. For example, it is also possible to employ a structure in which the seat front side of each side wall reinforcement portion 54C slopes such that, when viewed from the seat transverse direction, a lower portion thereof is located closer to the seat front than an upper portion thereof. In this case as well, compared with a structure in which, when viewed from the seat transverse direction, rectangular-shaped side wall reinforcement portions are provided, it is possible to prevent the multi-directional airbag 30 being obstructed by the side wall reinforcement portions 54C during inflation and deployment.

Furthermore, from the standpoint of hastening the inflation and deployment of the multi-directional airbag 30, it is also possible to employ a structure in which, when the outward roll-fold portion 30A is housed, it is positioned on the front side of the inside of the airbag case 50 so that, when viewed from the seat transverse direction, the outward roll-fold portion 30A and the side wall portions 54C do not overlap with each other. For example, if a positioning component such as a urethane pad or the like is disposed in a rear portion of the inside of the airbag case 50, then the outward roll-fold portion 30A can be positioned on the front side of the inside of the airbag case 50. As a consequence, it is possible to prevent the outward roll-fold portion 30A from moving to the rearward side of the inside of the airbag case 50 because of vibrations or the like while the vehicle is traveling, and the outward roll-fold portion 30A can be effectively prevented from overlapping with the side wall reinforcement portions 54C when viewed from the seat transverse direction.

Moreover, in the present exemplary embodiment, the reaction force plate 54 and the case main body 52 are formed as a single integral body via insert molding, however, the present invented is not limited to this. For example, it is also possible to firstly form the case main body 52 using a resin mold, and to thereafter assemble the reaction force plate 54 together with the case main body 52. Furthermore, the reaction force plate 54 is formed from metal, however, the present invention is not limited to this, and provided that the reaction force plate 54 has greater rigidity than the case main body 52, then the reaction force plate 54 may be formed from another material. For example, it is also possible to form the reaction force plate 54 from fiber-reinforced resin that has been reinforced with glass fibers or the like, or from reinforced resin that has been reinforced with talc (i.e., with finely ground talcum powder). In this case as well, because the rigidity of the lower portion side of the case main body 52 is increased by the reaction force plate 54, this structure has the effect of causing a reaction force towards the seat front side to act on the multi-directional airbag 30 during inflation and deployment.

Furthermore, in the present exemplary embodiment, a design surface is formed on the rear portion of the headrest 18 by the airbag case 50, however, the present invention is not limited to this. For example, it is also possible to create a sense of harmony by covering the airbag case 50 and the headrest main body 19 with upholstery.

Moreover, in the present exemplary embodiment, the headrest 18 and the seat back 16 are joined together by the stays 21, however, the present invention is not limited to this. It is also possible for the headrest 18 and the seat back 16 to be formed as an integrated structure. In this case, the portion thereof that is constructed such that it is able to support the head portion H of the vehicle occupant D from the rear corresponds to the 'headrest main body' of the present invention.

Moreover, in the above-described exemplary embodiment, the inflator 32 is disposed inside the airbag case 50, however, the present invention is not limited to this. For example, it is also possible to dispose the inflator 32 inside the upper portion of the seat back 16. Moreover, the number and placement of the inflators 32 are not limited and it is possible, for example to dispose inflators 32 vertically inside the seat back 16 such that the longitudinal direction thereof is aligned with the seat up-down direction.

Furthermore, the present invention is not limited to a structure in which the seatbelt device 24 is provided in the vehicle seat 12, and it is also possible to employ a structure in which the retractor 26, anchor 24A, buckle 24B and the like are provided on the vehicle body. Moreover, in a structure in which the vehicle occupant protection device 10 is provided with the seatbelt device 24, then the seatbelt device 24 is not limited to being a three-point type of device, and may also be a four-point type of seatbelt device or the like.

Moreover, in the present exemplary embodiment, an example is described in which the vehicle seat 12 is disposed such that the seat transverse direction matches the vehicle transverse direction, however, the present invention is not limited to this. For example, the vehicle seat 12 may also be disposed diagonally relative to the vehicle body, or may be constructed such that the orientation thereof relative to the vehicle body is able to be altered (by being rotated around a vertical axis). Because the multi-directional airbag 30 is inflated and deployed such that it covers the head portion H of the vehicle occupant D even if this type of structure is employed, this can also contribute to the superior protection of the head portion H. Moreover, because the multi-directional airbag 30 is housed in the headrest 18, it is difficult for there to be any interference between the multi-directional airbag 30 and the vehicle cabin interior surfaces or vehicle cabin interior components, and any impediment to the operation to alter the orientation of the vehicle seat 12 relative to the vehicle body can be suppressed or prevented.

What is claimed is:

1. A vehicle occupant protection device comprising:
   an airbag that is inflated and deployed upon being supplied with gas, and that is constructed as an integrated bag body that is configured to be deployed in an area that includes a front side of a head portion of a vehicle occupant, and in an area that includes both left and right sides of the head portion of the vehicle occupant so as to cover the head portion; and
   an airbag case that is constructed so as to include a box-shaped case main body that is provided on a seat rear side of a headrest main body that supports the head portion from a rear, and in which the airbag is housed in a folded state, and that is formed from resin, and whose upper portion opens up during an inflation and deployment of the airbag, and a reaction force plate that is provided in a lower portion side of the case main body, and is formed by a component having greater rigidity than the case main body, and that supports the airbag from the seat rear side during the inflation and deployment of the airbag.

2. The vehicle occupant protection device according to claim 1, wherein the reaction force plate is provided with a rear wall reinforcement portion that is disposed in parallel with a rear wall of the case main body, and side wall reinforcement portions that extend towards a seat front side in parallel with side walls of the case main body from both sides in a seat transverse direction of the rear wall reinforcement portion, and wherein
   seat front sides of the side wall reinforcement portions either slope or are curved such that, when viewed from the seat transverse direction, a lower portion of each side wall reinforcement portion is located closer to the respective seat front side than an upper portion of each side wall reinforcement portion.

3. The vehicle occupant protection device according to claim 2, wherein the airbag is constructed so as to include an outward roll-fold portion that is folded into a roll shape that is rolled up from a front end side of the airbag in a deployed state towards an outer surface side, and is housed in the airbag case, and a bellows-fold portion that is folded into a bellows fold underneath the outward roll-fold portion, and is housed in the airbag case, and wherein
   the outward roll-fold portion is housed in a location where, when viewed from the seat transverse direction, it does not overlap with the side wall reinforcement portions.

4. The vehicle occupant protection device according to claim 2, wherein the reaction force plate is further provided with a lower wall reinforcement portion disposed inside the lower portion side of the case main body.

5. The vehicle occupant protection device according to claim 2, wherein a top end portion of the rear wall reinforcement portion is located on a seat upper side of an intermediate portion in a seat up-down direction of the rear wall, and the rear wall reinforcement portion does not extend as far as an upper portion of the rear wall.

6. The vehicle occupant protection device according to claim 1, wherein the reaction force plate is made from metal.

* * * * *